(12) United States Patent
Richardson et al.

(10) Patent No.: US 11,261,876 B2
(45) Date of Patent: Mar. 1, 2022

(54) FAN WITH INTEGRATED SHAFT GUARD

(71) Applicant: Parker-Hannifin Corporation, Cleveland, OH (US)

(72) Inventors: Jason Scot Richardson, Chuckey, TN (US); Thomas Kevin Castle, Morristown, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 858 days.

(21) Appl. No.: 15/481,581

(22) Filed: Apr. 7, 2017

(65) Prior Publication Data
US 2017/0298947 A1    Oct. 19, 2017

Related U.S. Application Data

(60) Provisional application No. 62/322,426, filed on Apr. 14, 2016.

(51) Int. Cl.
| F04D 29/32 | (2006.01) |
| F04D 29/70 | (2006.01) |
| F16H 61/4165 | (2010.01) |

(52) U.S. Cl.
CPC ......... F04D 29/329 (2013.01); F04D 29/703 (2013.01); F16H 61/4165 (2013.01)

(58) Field of Classification Search
None
See application file for complete search history.

(56) References Cited

U.S. PATENT DOCUMENTS

| 2,065,834 | A | * | 12/1936 | Swennes | F04D 11/00 |
| | | | | | 123/41.82 R |
| 2,660,487 | A | * | 11/1953 | Wilfley | F04D 29/146 |
| | | | | | 384/478 |
| 3,385,516 | A | * | 5/1968 | Omohundro | F04D 25/082 |
| | | | | | 416/93 R |
| 3,482,844 | A | * | 12/1969 | McKinven, Jr. | F16J 15/3232 |
| | | | | | 277/349 |
| 4,245,957 | A | * | 1/1981 | Savage | F04D 29/263 |
| | | | | | 416/135 |

(Continued)

OTHER PUBLICATIONS

Oberg, E. Jones, F.D. Horton, H.L. Ryffell, H.H.. (2000). Machinery's Handbook (26th Edition)—Tapered Retaining Rings. (pp. 1665-1668). Industrial Press. Retrieved from https://app.knovel.com/hotlink/pdf/id:kt002Q8HC1/machinerys-handbook-26th/tapered-retaining-rings (Year: 2000).*

(Continued)

*Primary Examiner* — Peter J Bertheaud
*Assistant Examiner* — Geoffrey S Lee
(74) *Attorney, Agent, or Firm* — Renner, Otto, Boisselle & Sklar, LLP

(57) ABSTRACT

A cooling fan or use with a hydraulic pump having an input shaft in a hydrostatic transmission includes a rotatable hub having a central body portion and an axially extending peripheral surface and a plurality of blades that extend radially outward from the peripheral surface. The cooling fan also includes an attachment aperture defined by the central body portion and an integral flange that axially extends from the central body portion. The integral flange defines a guard space having an area that is less than an area defined by the peripheral surface.

18 Claims, 3 Drawing Sheets

(56) References Cited

U.S. PATENT DOCUMENTS

| | | | | |
|---|---|---|---|---|
| 4,427,202 A | * | 1/1984 | Backlin | F16J 15/54 |
| | | | | 277/349 |
| 4,738,328 A | | 4/1988 | Hayden | |
| 5,979,903 A | * | 11/1999 | Kwasniewski | F16J 15/3256 |
| | | | | 277/423 |
| 6,224,335 B1 | * | 5/2001 | Parisi | F04D 29/162 |
| | | | | 415/206 |
| 6,569,049 B1 | | 5/2003 | Folsom et al. | |
| 6,682,453 B1 | * | 1/2004 | Okada | F16H 39/14 |
| | | | | 475/83 |
| 7,261,178 B2 | * | 8/2007 | Okada | A01D 34/63 |
| | | | | 180/235 |
| 7,673,712 B2 | * | 3/2010 | Iida | A01D 69/08 |
| | | | | 180/53.1 |
| 8,112,991 B1 | * | 2/2012 | Iida | B60K 17/105 |
| | | | | 60/487 |
| 8,250,862 B1 | * | 8/2012 | Iida | B60T 1/062 |
| | | | | 180/308 |
| 8,342,808 B2 | * | 1/2013 | Ota | F04D 29/325 |
| | | | | 416/169 A |
| D761,881 S | * | 7/2016 | Small | D15/28 |
| D773,632 S | * | 12/2016 | Panyasahabade | D23/379 |
| 2004/0265125 A1 | * | 12/2004 | Spaggiari | F04D 25/082 |
| | | | | 415/220 |
| 2006/0213364 A1 | | 9/2006 | Cox | |
| 2007/0066434 A1 | * | 3/2007 | Iida | A01D 69/08 |
| | | | | 475/89 |
| 2008/0050231 A1 | * | 2/2008 | Spaggiari | F04D 25/082 |
| | | | | 415/220 |
| 2010/0001602 A1 | * | 1/2010 | Bossaller | H02K 11/40 |
| | | | | 310/89 |

OTHER PUBLICATIONS

Oberg, E. Jones, F.D. Horton, H.L. Ryffell, H.H.. (2000). Machinery's Handbook (26th Edition)—Method of Bearing Designation. (pp. 2246-2255). Industrial Press. Retrieved from https://app.knovel.com/hotlink/pdf/id:kt002Q8YN2/machinerys-handbook-26th/method-bearing-designation (Year: 2000).*

Cub Cadet Part 931-3009, Fan-Cooling; PartsTree.com, Apr. 29, 2016, online order website.

* cited by examiner

FAN WITH INTEGRATED SHAFT GUARD

This application claims priority of U.S. Provisional Application No. 62/322,426 filed on Apr. 14, 2016, which is incorporated herein by reference in its entirety.

FIELD OF INVENTION

The present invention relates generally to hydraulic pumps and motors, and more particularly to shaft guards in hydrostatic transmissions.

BACKGROUND

A prime mover, such as an internal combustion engine or the like, can be connected to a hydrostatic transmission. A hydrostatic transmission is particularly suitable to provide traction drive for vehicles such as turf machines, lawn tractors, ride-on lawn mowers, and like devices. A simple usage of hydrostatic transmissions is on zero-turn radius vehicles, including zero-turn radius mowers and tractors.

Generally, a hydrostatic transmission includes a hydraulic pump and a hydraulic motor. The hydraulic pump usually is a piston-type pump including a plurality of reciprocating pistons which are in fluid communication through hydraulic porting with the hydraulic motor. Rotation of the hydraulic pump against a moveable swash plate creates an axial motion of the pump pistons that forces hydraulic fluid through the hydraulic porting to the hydraulic motor. This drives the motor, which allows the transmission output speed to be varied and controlled. The rotation of the hydraulic motor may be used to drive an output shaft, which in turn ultimately drives a wheel axle of a vehicle of the types described above.

Due to heat generated from the rotating components in the transmission, a fan is provided to cool the transmission. Enhanced cooling is provided by mounting the fan directly to the input shaft of the hydraulic pump. However, positioning the fan on the input shaft of the pump has drawbacks. One drawback is that at least a portion of the input shaft and the housing of the pump is exposed to an external environment allowing foreign debris to enter and collect around the exposed area of the shaft between the shaft seal and the fan.

SUMMARY OF INVENTION

A shaft guard according to the present invention may be used with a hydraulic pump having an input shaft in a hydrostatic transmission to prevent foreign object debris from collecting around the shaft seal located on the transmission or pump. The shaft guard includes a rotatable hub having a central body portion and an axially extending peripheral surface. An attachment aperture is defined by the central body portion and is configured to attach the hub to the input shaft of the hydraulic pump. The shaft guard includes an integral flange that axially extends from the central body portion and defines a guard space having an area that is less than an area defined by the peripheral surface.

A shaft guard assembly may be used with a hydraulic pump in a hydrostatic transmission and includes a shaft guard and an input shaft that actuates the hydraulic pump. The shaft guard has a rotatable hub having a central body portion and an axially extending peripheral surface, an attachment aperture defined by the central portion, and an integral flange that axially extends from the central body portion and defines a guard space having an area that is less than an area defined by the peripheral surface. The input shaft has an end attached to the attachment aperture, where the attachment aperture is configured to attach the hub to the input shaft and a rotation of the input shaft imparts a commensurate rotation of the shaft guard. The guard space surrounds a portion of the input shaft.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

The principles of the present application have particular application in a hydrostatic transmission. The hydrostatic transmission may be implemented in a vehicle configuration having a dual hydrostatic transmission system, where a right side transmission drives a right side wheel and a left side transmission drives a left side wheel. Such dual hydrostatic transmission systems are particularly suitable for zero-turn radius mowers and lawn tractors. In an alternative light vehicle configuration, a modular hydrostatic transaxle system includes a single hydrostatic transmission attached to a transaxle including a differential gearing system and an axle shaft. In either configuration, the vehicle wheels are driven by the one or dual hydrostatic transmissions. An exemplary hydrostatic transmission is described in International Patent Application No. PCT/US2014/016353, of which the entirety is hereby incorporated by reference.

Figure 1:
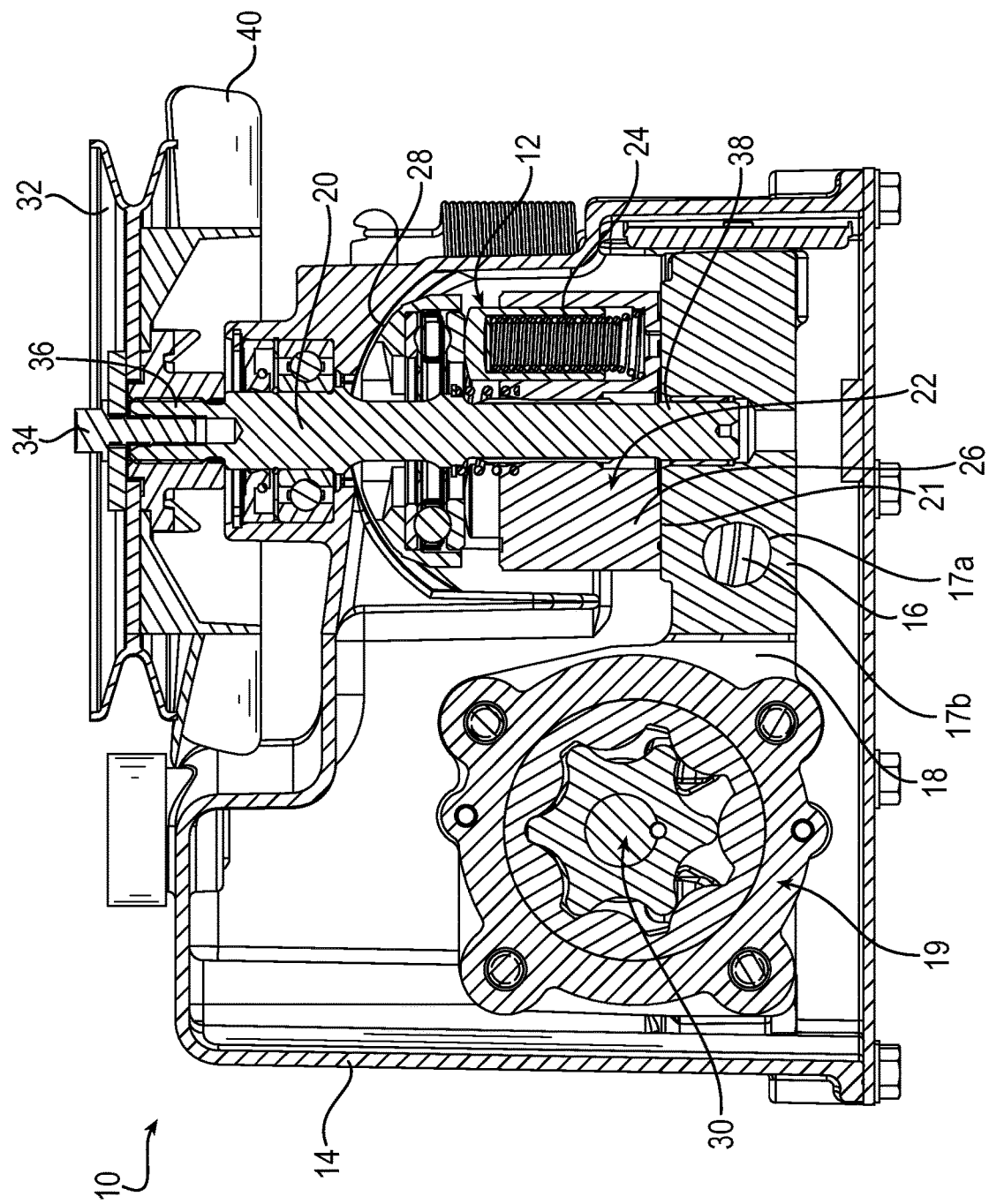
FIG. 1 is a drawing depicting a cross-sectional view of a hydrostatic transmission having a hydraulic pump.

Referring now to FIG. 1, an exemplary hydrostatic transmission 10 includes a hydraulic pump 12 and a motor sub-assembly 19. The hydraulic pump 12 and motor sub-assembly 19 are housed within a housing 14 of the hydrostatic transmission 10. The hydrostatic transmission 10 includes center section structures that include porting between the pump 12 and the motor sub-assembly 19, where the center section structures including a pump interfacing portion 16 and a motor connection portion 18 that form a portion manifold 17a having internal passages 17b for communicating hydraulic fluid between the pump 12 and the motor sub-assembly 19. The pump 12 includes an input shaft 20 and a piston rotating group 22 having a plurality of pistons 24 that are supported on a barrel 26. The pump interfacing portion 16 includes a pump running face 21 that interfaces with the components of the pump 12. The rotating group is driven by the input shaft 20 and rotates against the pump running face and adjacent a rotatable swash plate 28. With the rotation of the swash plate 28, the pistons 24 extend and contract to drive hydraulic fluid in and out. The flow is directed through the motor connection portion 18 to produce a power output via an output shaft 30 associated with the motor sub-assembly 19. The output shaft 30 may be configured to deliver power to at least one of the vehicle wheels.

The input shaft 20 may be coupled to an input belt pulley 32 connected to a prime mover of the hydrostatic transmission, such as an internal combustion engine. The input belt pulley 32 is configured to rotate the input shaft 20. A fastener 34 is coupled internally to the input shaft 20, and the fastener 34 extends outward from the housing 14. The fastener 34 and attached input shaft 20 may be coupled to the input belt pulley 32. As shown in FIG. 1, the input belt pulley 32 may be located at a first end 36 of the input shaft 20. The first end 36 may be a top end of the input shaft 20 and the second end 48 may be a bottom end. It should also be recognized that the input belt pulley 32 may be positioned at a second end 38 of the input shaft 20, such that the input belt pulley 32 may be located at the bottom end of the input shaft 20. The fastener 34 may also couple a cooling fan 40 to the input shaft 20. The cooling fan 40 operates to provide cooling for the hydrostatic transmission and enhanced cooling is provided by mounting the cooling fan 40 to the input shaft 20, directly adjacent to the input belt pulley 32.

Figure 2:
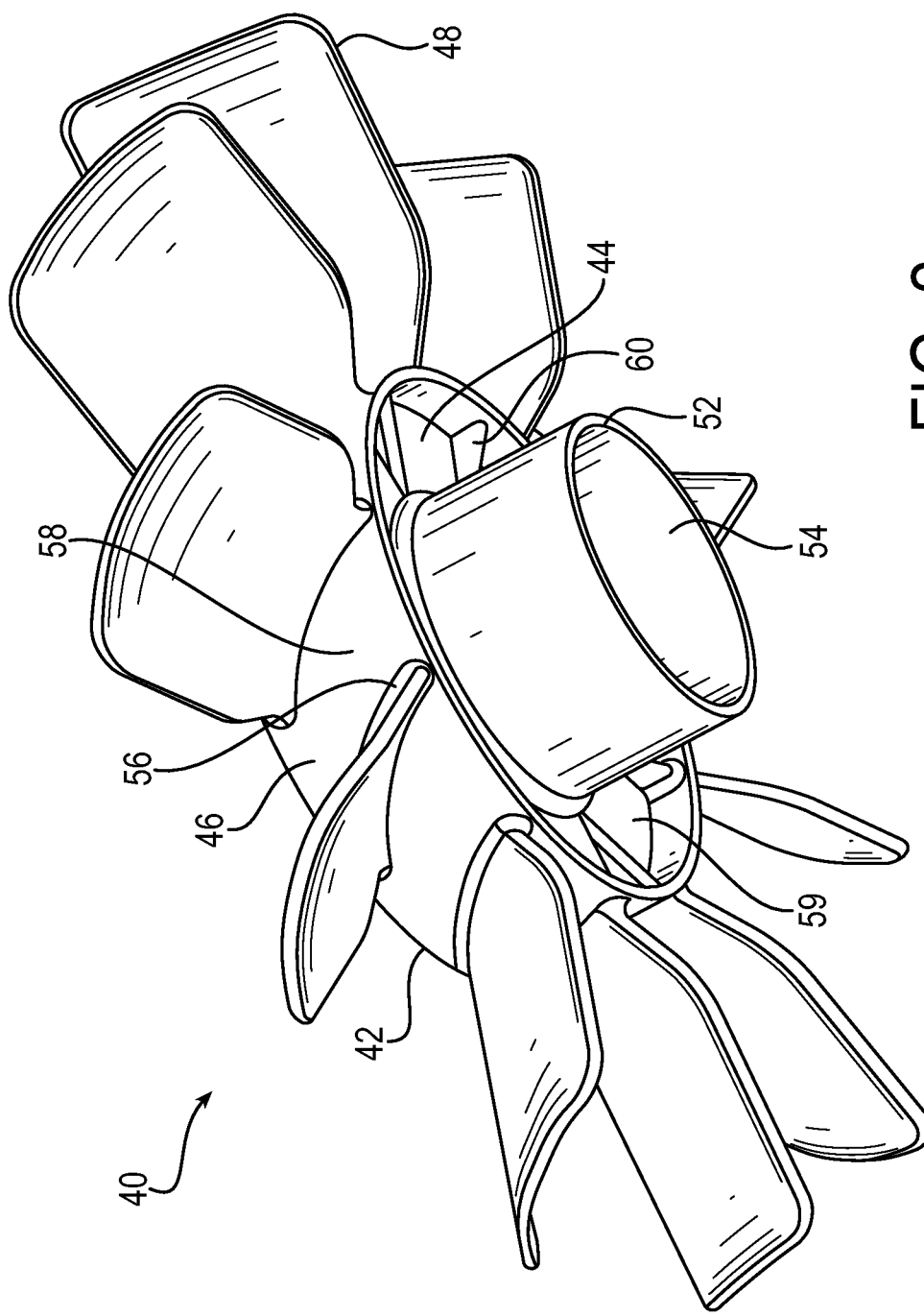
FIG. 2 is a drawing depicting a perspective view of an exemplary cooling fan with a shaft guard according to embodiments the present application.

Referring now to FIG. 2, a shaft guard may be implemented as part of the cooling fan 40. The shaft guard includes a rotatable hub 42 with a central body portion 44 and a cylindrical body portion 46 having an axially extending peripheral surface 58. A plurality of blades 48 extend radially outward from the peripheral surface 58. The cooling fan 40 includes an integral flange 52 that axially extends from the central body portion 44 and defines a guard space 54 having an area that is less than an area defined by the cylindrical body portion 46.

The hub 42 may be cylindrical and have a longitudinal axis, such that the peripheral surface 58 defines an outer diameter of the hub 42. The peripheral surface 58 may have an axial length that is substantially greater than a radial thickness of the cylindrical body portion 46. Each of the plurality of blades 48 may have an end 56 attached to the peripheral surface 58. Each of the plurality of blades 48 may be uniformly spaced apart relative to one another and attached to the peripheral surface 58 at an oblique angle relative to the longitudinal axis. The central body portion 44 may include a radial surface 59 that extends from the integral flange 52 to the cylindrical body portion 46. The radial surface 59 may be a web having protrusions 60 attached between the web and an inner wall 62 of the cylindrical body portion 46.

The integral flange 52 may be annular and may axially extend from the radial surface 59 at a radial position between the longitudinal axis and a radial position of the cylindrical body portion 46. The integral flange 52 and the hub 42 may be formed of a unitary body as continuous parts of the body, such that the integral flange 52 and the hub 42 rotate uniformly about the longitudinal axis. The cylindrical body portion 46 and the integral flange 52 may be coaxial along the longitudinal axis.

Figure 3:
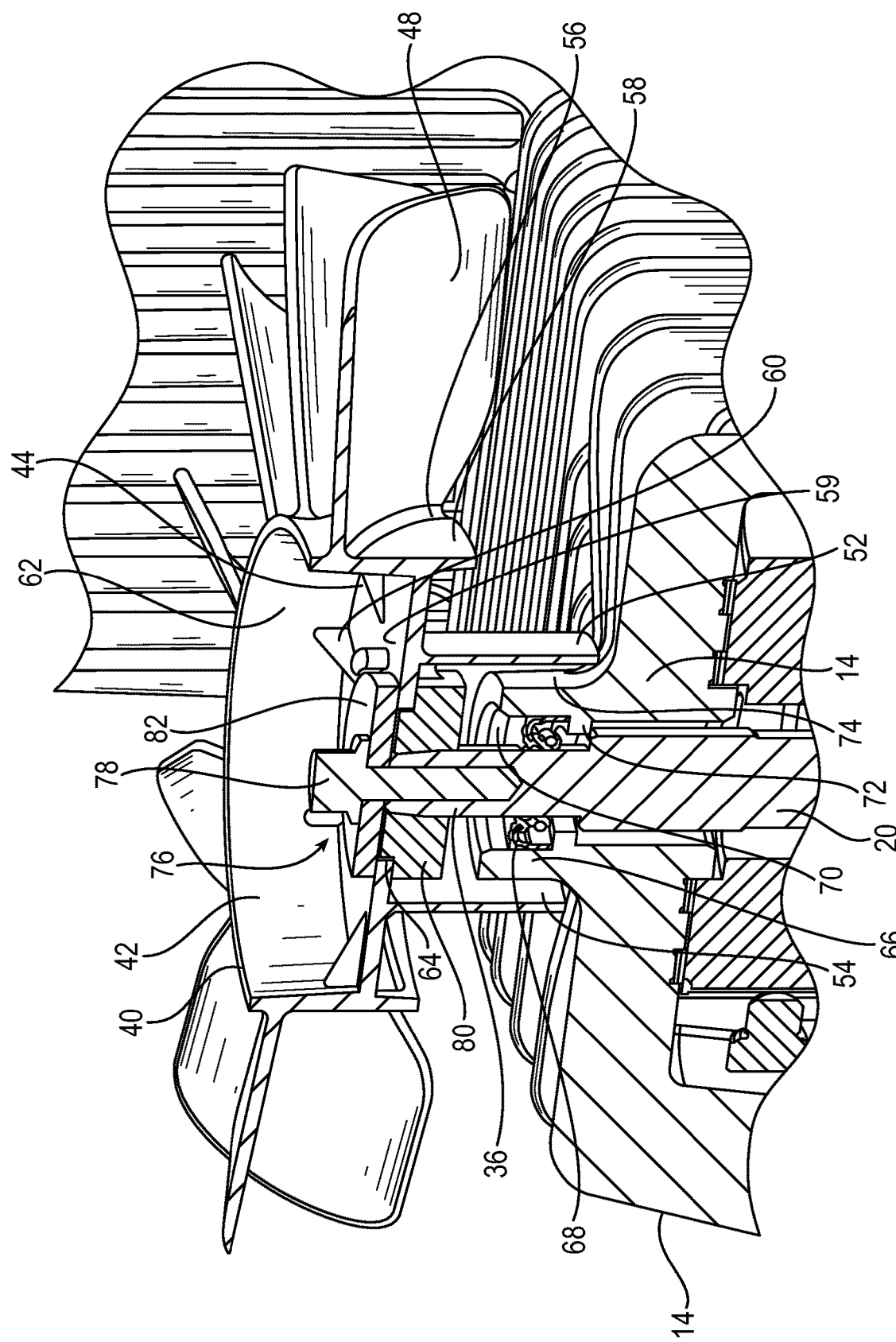
FIG. 3 is a drawing depicting a perspective view of the cooling fan of FIG. 2 as configured to be used as part of the hydrostatic transmission in FIG. 1.

Referring now to FIG. 3, the shaft guard may be part of a cooling fan assembly that includes the cooling fan 40 along with the input shaft 20 of the hydraulic pump, shown in cross-section. The top end, or first end 36 of the input shaft is attached to an attachment aperture 64 defined by the central body portion 44 of the hub 42. The attachment aperture 64 may be defined by the radial surface 59 of the central body portion 44. Rotation of the input shaft 20 imparts a commensurate rotation of the shaft guard of the cooling fan 40, and the blades 48 rotate commensurately to provide an air flow over the hydrostatic transmission to provide the cooling effect. The guard space 54 defined by the integral flange 52 receives the end 36 of the input shaft 20, such that the integral flange 52 surrounds the end 36 of the input shaft 20. The integral flange 52 is radially spaced outward from the input shaft 20. The integral flange 52 axially extends from the radial surface 59 at a radial position located between the attachment aperture 64 and a radial position of the cylindrical body portion 46.

The first end 36 of the input shaft 20 may extend axially outwardly from a shaft supporting portion 66 of the housing 14 of the hydraulic pump. The shaft supporting portion 66 may be tubular and extend axially outward from the housing 14. The input shaft 20 may be aligned along a longitudinal axis of the shaft supporting portion 66. The shaft supporting portion 66 may have a diameter that is greater than the diameter of the input shaft 20 and less than the diameter of the integral flange 52. The shaft supporting portion 66 may support the first end 36 of the input shaft 20 and includes a shaft seal 68 located on an inner wall 70 of the shaft supporting portion 66. The shaft seal 68 is provided between the input shaft 20 and the shaft supporting portion 66 of the housing 14 for sealing the input shaft 20 as it rotates within the housing 14. The shaft supporting portion 66 may further include a needle bearing 72 extending radially inwardly from the inner wall 70 of the shaft supporting portion 66. The needle bearing 72 is configured to support the first end 36 of the input shaft 20 and may align the input shaft 20 along the longitudinal axis of the shaft supporting portion 66.

The guard space 54 may receive the shaft supporting portion 66 and the shaft seal 68 such that the integral flange 52 surrounds the shaft supporting portion 66. The integral flange 52 may be radially spaced from an outer wall 74 of the shaft supporting portion 64, allowing the integral flange 52 to rotate relative to the housing 14. The configuration of the integral flange 52 is advantageous in providing a guard space 54 around an exposed portion of the first end 36 of the input shaft 20. The integral flange 52 prevents undesirable debris from contacting the input shaft 20. The integral flange 52 also surrounds the shaft seal 68 and the shaft supporting portion 66 to prevent the undesirable debris from contacting the shaft seal 68 or entering the housing 14 of the hydraulic pump. The integral flange 52 is uniformly rotatable with the input shaft 20 to guard the components of the cooling fan assembly during rotation of the input shaft 20 and the cooling fan 36.

The cooling fan 36 is attached for rotation with the input shaft 20 via a fastening mechanism 76. The fastening mechanism 76 couples the hub 40 of the cooling fan 36 to the first end 36 of the input shaft 20. The fastening mechanism 76 may include a screw or bolt 78 extending through the first end 36 along the longitudinal axis of the input shaft 20. The screw or bolt 78 extends through the attachment aperture 64 of the central body portion 44 of the cooling fan 36. The fastening mechanism 76 may include at least one washer 80, 82 interposed between the screw or bolt 78 and the central body portion 44 of the hub 42. The at least one washer 80, 82 may include a first washer 80 and a second washer 82 that axially sandwich the attachment aperture 64 in a stacked arrangement for securing the cooling fan 36 to the input shaft 20. The first and second washer 80, 82 may sandwich the radial surface 59 of the central body portion 44. The first washer 80 may surround a portion of the input shaft 20 at the first end 36 of the input shaft 20. The second washer 82 may surround the screw or bolt 78. Each of the first and second washer 80, 82 may have a diameter that is smaller than the diameter of the integral flange 52. The guard space 52 may receive the first washer 80 and the integral flange 52 may be radially spaced outward from the first washer 80. The first washer 80 may have a greater thickness than the second washer 82.

The shaft guard may be used in various applications. One application may be in the turf industry, such as implementation on a zero turn radius mower. The shaft guard may be used in cooling fans, transmission fans, or axial fans in any suitable application.

In accordance with the above description, an aspect of the invention is a shaft guard for use with a hydraulic pump having an input shaft in a hydrostatic transmission, where the shaft guard includes a rotatable hub having a central body portion and an axially extending peripheral surface, an attachment aperture defined by the central body portion, and an integral flange that axially extends from the central body portion and defines a guard space having an area that is less than an area defined by the peripheral surface.

The hub may be cylindrical.

The integral flange may be annular.

The shaft guard may include a plurality of blades that extend radially outward from the peripheral surface.

The central body portion may include a radial surface radially extending between the attachment aperture and the peripheral surface.

The radial surface may be a web that has at least one protrusion attached between the radial surface and the peripheral surface.

The integral flange may axially extend from the radial surface at a radial position located between the attachment aperture and a radial position of the peripheral surface.

In an exemplary embodiment of a shaft guard assembly, the shaft guard assembly may be used with a hydraulic pump in a hydrostatic transmission. The shaft guard assembly includes a shaft guard having a central body portion and an axially extending peripheral surface, an attachment aperture defined by the central portion, and an integral flange that axially extends from the central body portion and defines a guard space having an area that is less than an area defined by the peripheral surface, and an input shaft that actuates the hydraulic pump and has an end attached to the attachment aperture. The attachment aperture is configured to attach the hub to the input shaft and a rotation of the input shaft imparts a commensurate rotation of the shaft guard. The guard space surrounds a portion of the input shaft.

A cooling fan assembly may include the shaft guard and a plurality of blades that extend radially outward from the peripheral surface, In an exemplary embodiment of the cooling fan assembly, a fastening mechanism may couple the hub of the cooling fan to the end of the input shaft for rotation with the input shaft.

The fastening mechanism may include a screw or a bolt extending through the end of the input shaft along a longitudinal axis of the input shaft.

The screw or bolt may axially extend through the attachment aperture of the central body portion into the end of the shaft.

The fastening mechanism may include at least one washer interposed between the screw or bolt and the central body portion of the hub.

The at least one washer may include a first washer and a second washer that axially sandwich the attachment aperture in a stacked arrangement.

The first washer may surround a portion of the input shaft at the end of the input shaft and the second washer surrounds the screw or bolt.

The integral flange may receive the first washer.

The first washer may have a greater thickness than the second washer.

The cooling fan assembly may include a hydraulic pump, where the hydraulic pump has a piston rotating group and rotation of the input shaft drives rotation of the piston rotating group of the hydraulic pump.

The hydraulic pump may include a housing, and an end portion of the input shaft may extend axially outwardly from the housing of the hydraulic pump.

The hydraulic pump may include a shaft supporting portion within the housing that supports the end portion of the input shaft, and a shaft seal between the input shaft and the housing.

The shaft supporting portion may include a needle bearing extending radially inwardly from an outer wall of the housing to support the end portion of the input shaft.

The guard space may surround the shaft supporting portion.

A hydrostatic transmission may include the cooling fan assembly, a hydraulic pump, and a hydraulic motor for driving an output shaft, wherein the hydraulic pump is in fluid communication with the hydraulic motor to drive the hydraulic motor.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A shaft guard for use with a hydraulic pump having an input shaft in a hydrostatic transmission, the shaft guard comprising:
    a rotatable hub having a central body portion that is disc-shaped and a cylindrical body portion that extends axially from an outer circumference of the central body portion, the cylindrical body portion having an axially extending peripheral surface, wherein the outer circumference of the central body portion forms a circumferentially continuous attachment surface with the cylindrical body portion;
    a plurality of blades that extend radially outward from the axially extending peripheral surface, each of the plurality of blades having a radially innermost end that is attached to the axially extending peripheral surface;

an attachment aperture defined by the central body portion;
a radial surface defined by the central body portion that radially extends between the attachment aperture and the cylindrical body portion; and
an integral flange that is continuously formed with the rotatable hub and axially extends from the radial surface of the central body portion past the cylindrical body portion, wherein the integral flange is radially spaced from the input shaft to define a guard space having an area that is less than an area defined by the cylindrical body portion,
wherein the rotatable hub, the plurality of blades, and the integral flange are formed as a single continuous part.

2. The shaft guard according to claim 1, wherein the integral flange is annular.

3. The shaft guard according to claim 1 further comprising at least one protrusion attached between the radial surface and the cylindrical body portion.

4. The shaft guard according to claim 1, wherein the integral flange axially extends from the radial surface at a radial position located between the attachment aperture and a radial position of the cylindrical body portion.

5. The shaft guard according to claim 1, wherein the circumferentially continuous attachment surface is arranged in a plane perpendicular to an axis of rotation of the rotatable hub.

6. A shaft guard assembly for use with a hydraulic pump in a hydrostatic transmission, the shaft guard assembly comprising:
a rotatable hub with a central body portion that is disc-shaped and a cylindrical body portion that extends axially from an outer circumference of the central body portion and has an axially extending peripheral surface, an attachment aperture defined by the central portion, a radial surface defining the attachment aperture and radially extending between the attachment aperture and the cylindrical body portion, and an integral flange that is continuously formed with the central body portion and axially extends from the radial surface of the central body portion and past the cylindrical body portion to define a guard space having an area that is less than an area defined by the cylindrical body portion, wherein the outer circumference of the central body portion forms a circumferentially continuous attachment surface with the cylindrical body portion;
a plurality of blades that extend radially outward from the axially extending peripheral surface, each of the plurality of blades having a radially innermost end that is attached to the axially extending peripheral surface; and
an input shaft that actuates the hydraulic pump and has an end attached to the attachment aperture, wherein the attachment aperture is configured to attach the rotatable hub to the input shaft and a rotation of the input shaft imparts a commensurate rotation of the rotatable hub;
wherein the guard space surrounds a portion of the input shaft, and wherein the rotatable hub, the plurality of blades, and the integral flange are formed as a single continuous part that is attachable to the input shaft.

7. The shaft guard assembly according to claim 6, wherein the integral flange is annular.

8. A cooling fan assembly comprising the shaft guard assembly according to claim 6.

9. The cooling fan assembly according to claim 8 further comprising at least one protrusion attached between the radial surface and the cylindrical body portion.

10. The cooling fan assembly according to claim 8, wherein the integral flange axially extends from the radial surface at a radial position located between the attachment aperture and a radial position of the cylindrical body portion.

11. The cooling fan assembly according to claim 8 further comprising:
a fastening mechanism coupling the rotatable hub of the cooling fan to the end of the input shaft for rotation with the input shaft, wherein the fastening mechanism includes a screw or a bolt extending through the end of the input shaft along a longitudinal axis of the input shaft.

12. The cooling fan assembly according to claim 11, wherein the screw or bolt axially extends through the attachment aperture of the central body portion into the end of the shaft, and wherein the fastening mechanism includes at least one washer interposed between the screw or bolt and the central body portion of the rotatable hub.

13. The cooling fan assembly according to claim 12, wherein the at least one washer includes a first washer and a second washer that axially sandwich the attachment aperture in a stacked arrangement, wherein the first washer surrounds a portion of the input shaft at the end of the input shaft and the second washer surrounds the screw or bolt.

14. The cooling fan assembly according to claim 8, further comprising a hydraulic pump, wherein the hydraulic pump has a piston rotating group and rotation of the input shaft drives rotation of the piston rotating group of the hydraulic pump, wherein the hydraulic pump has a housing, and an end portion of the input shaft extends axially outwardly from the housing of the hydraulic pump.

15. The cooling fan assembly according to claim 14, wherein the hydraulic pump includes a shaft supporting portion within the housing that supports the end portion of the input shaft, and a shaft seal between the input shaft and the housing, wherein the guard space surrounds the shaft supporting portion.

16. The cooling fan assembly according to claim 15, wherein the shaft supporting portion includes a needle bearing extending radially inwardly from an outer wall of the housing to support the end portion of the input shaft.

17. A hydrostatic transmission comprising:
the cooling fan assembly according to claim 14; and
a hydraulic motor for driving an output shaft, wherein the hydraulic pump is in fluid communication with the hydraulic motor to drive the hydraulic motor.

18. A shaft guard for use with a hydraulic pump having an input shaft in a hydrostatic transmission, the shaft guard comprising:
a rotatable hub having a central body portion that is disc-shaped and a cylindrical body portion that extends axially from an outer circumference of the central body portion, the cylindrical body portion having an axially extending peripheral surface, wherein the outer circumference of the central body portion forms an attachment surface with the cylindrical body portion, the attachment surface being arranged in a plane perpendicular to an axis of rotation of the rotatable hub;
a plurality of blades that extend radially outward from the axially extending peripheral surface, each of the plurality of blades having a radially innermost end that is attached to the axially extending peripheral surface;
an attachment aperture defined by the central body portion;
a radial surface defined by the central body portion that radially extends between the attachment aperture and the cylindrical body portion; and an integral flange that is continuously formed with the rotatable hub and axially extends from the radial surface of the central body portion past the cylindrical body portion, wherein the integral flange is radially spaced from the input shaft to define a guard space having an area that is less than an area defined by the cylindrical body portion, wherein the rotatable hub, the plurality of blades, and the integral flange are formed as a single continuous part.

* * * * *